Figure 2:
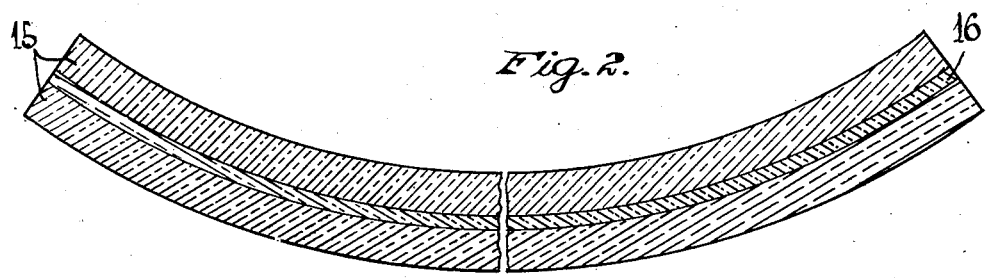

May 17, 1949. L. V. BLACK 2,470,461
METHOD OF MANUFACTURING GLASS
Filed April 19, 1944 2 Sheets-Sheet 1
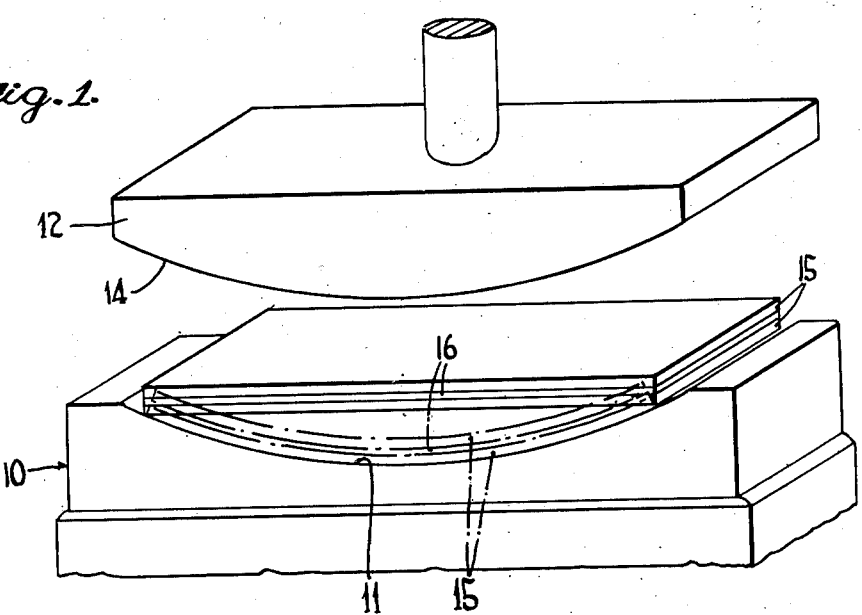
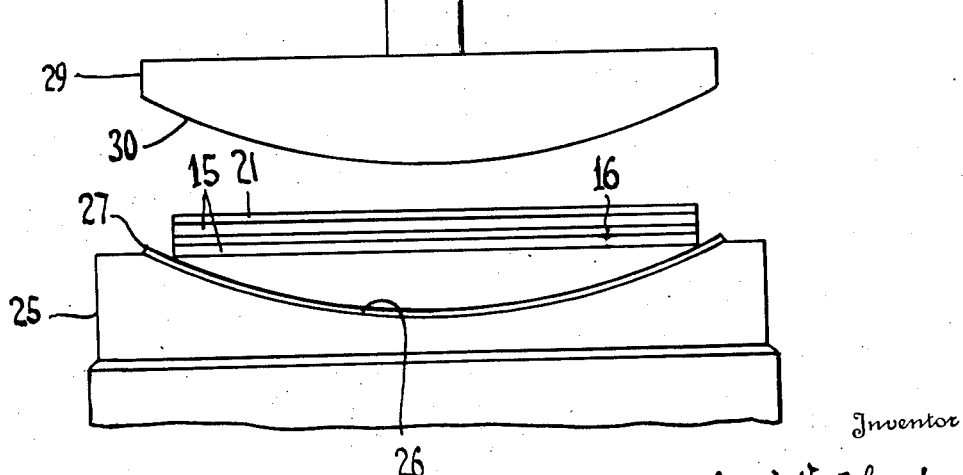
Inventor
Lloyd V. Black
By Olen E. Bee
Attorney May 17, 1949.  L. V. BLACK  2,470,461
METHOD OF MANUFACTURING GLASS
Filed April 19, 1944  2 Sheets-Sheet 2

Inventor
Lloyd V. Black
By Olen E. Bee
Attorney

Patented May 17, 1949

2,470,461

UNITED STATES PATENT OFFICE 2,470,461

METHOD OF MANUFACTURING GLASS

Lloyd V. Black, Tarentum, Pa., assignor to Pittsburgh Plate Glass Company, Allegheny County, Pa., a corporation of Pennsylvania Application April 19, 1944, Serial No. 531,756

6 Claims. (Cl. 49—84)

This invention relates to the manufacture of laminated or safety glass and it has particular relation to methods of bending and laminating glass plates.

One object of the invention is to provide an improved method of manufacturing curved glass in such manner as to prevent the marring of opposed surfaces of curved plates which are to be assembled in a laminated unit.

Another object of the invention is to provide an improved method of bending superposed glass plates in such manner that the surfaces of the bent glass remain unblemished.

Another object of the invention is to provide an improved method of assembling and treating glass plates requiring different degrees of heat to reduce them to softened state, wherein the plates requiring the greater degree of heat are protected by the plates requiring the lesser degree of heat.

In connection with the definitions in the specification and claims, it is to be understood that the terms "lower softening point" and "higher softening point" refer to approximate temperatures at which the types of glass under consideration become soft under the application of heat to the extent that such glass can be bent.

In one form of the invention, glass plates to be bent and laminated are assembled in superposed relation upon opposite sides of an intermediate glass plate having a lower softening point. In an assembly of this kind, which is heated for the purpose of bending it, the glass so manufactured as to the lower softening point will become softer than the other plates, and hence will yield to any blemishes or slight inequalities in the harder glass plates. Likewise, in the event any dust particles or other foreign matter become lodged between the plates they will be pressed into the softer glass rather than into the harder glass at the softening temperature of the assembled plates. It is to be understood that under pressure of a curved plunger, or the like, plates of lower softening temperatures can be applied to the outer sides of the plates to be bent as well as between such plates, or the mold can be lined with a layer of glass of lower softening temperature.

Glass of lower softening temperature can be manufactured by including in the glass batch a high percentage of lead borate or lead oxide to produce so-called lead glass. Glass of low softening point is also characteristic of so-called phosphate glass, such as that disclosed in U. S. Patent No. 2,227,082, dated December 31, 1940. In connection with the invention under consideration here, lead or soft glass having 50° to 100° lower softening point than that of ordinary glass to be laminated has been found to be satisfactory. However, glass of even lower softening points can be produced if desired.

Figure 3:
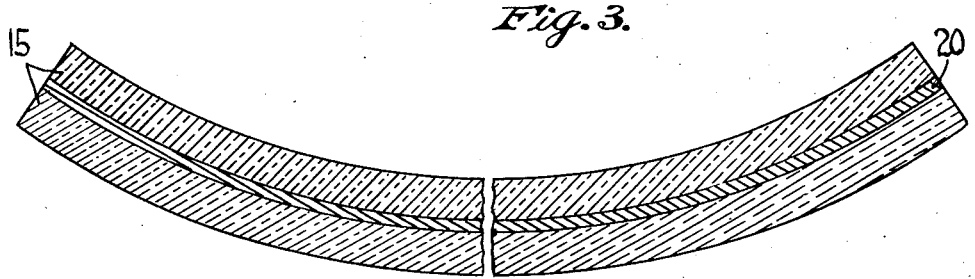
Figure 5:
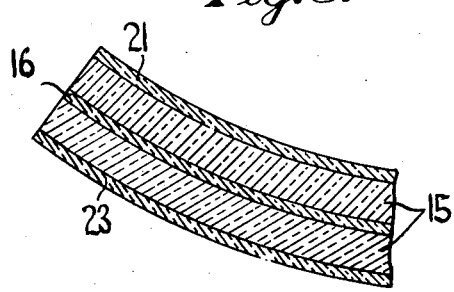
Figure 6:
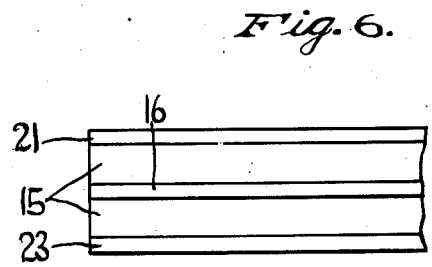

In the drawing:

Fig. 1 is a fragmentary perspective of a molding apparatus with glass plates resting thereon; Fig. 2 is a fragmentary cross-section, on a larger scale, of superposed glass plates bent to predetermined curvature; Fig. 3 is a fragmentary cross-section of a laminated unit manufactured according to the invention; Fig. 4 is a fragmentary front elevation of a molding apparatus with glass arranged in another form of assembly; Fig. 5 is a fragmentary cross-section on a larger scale, of superposed glass plates bent in connection with the operation of the mold shown in Fig. 4; and Fig. 6 is a fragmentary elevation of another assembly of glass plates of the type shown in Figure 5 before they are bent.

Referring to Figs. 1, 2, and 3, a molding apparatus 10 comprises a concave molding surface 11 and a pressure or plunger portion 12 having a convex molding face 14 for pressing an assembly of superposed glass plates 15 and 16 against the curved surface 11. It is to be understood that the type of mold disclosed is more or less diagrammatic and illustrative of one form of bending apparatus. Other types of molding or bending apparatus, such as that shown in U. S. patent to Galey 2,021,180, issued November 19, 1935, can be employed in connection with the bending and heat treatment of the glass plates 15 and 16.

Flat glass plates 15 are assembled upon opposite sides of the intermediate glass plate 16 and in this superposed relation they are bent to the shape shown in Fig. 2, or as shown in the broken lines of Fig. 1. The intermediate glass plate 16 softens at a temperature of 50° to 100° lower than the temperature required to soften the plates 15. Therefore, any foreign particles which may have been included between adjacent plates will be pressed into the softer glass without marring the surface of the plates 15 which are later to be laminated. Glass plates to be laminated are not always perfect in surface smoothness and whatever blemishes that may be present thereon are impressed upon the softer glass rather than subjecting the plates 15 to injury which might result if the bending operation were conducted without the use of an intermediate protecting plate.

After the glass plates have been bent and cooled the intermediate plate 16 is removed and the outer plates 15 are then laminated upon opposite sides of a sheet or layer 20 of organic plastic in the presence of heat and pressure of sufficient intensity to bond the glass and plastic surfaces together. This plastic, which can be in the form of vinyl acetal resin or other transparent resin employed in laminating glass, is the same in thickness as the removed protective plate 16. Since the glass plates have been bent into the relation they assume in the subsequently laminated unit, the likelihood of stress occurring in the finished article is reduced to a minimum.

Under certain conditions it may be desirable to protect all of the surfaces of the glass plates 15. Accordingly, as shown in Figs. 5 and 6, additional sheets 21 and 23 of softer glass of the same characteristics as the plate 16 are included in the assembly on the outer sides of the glass plates 15. The glass is bent in the mold 10 in the same manner as that described above, but in this case all of the surfaces are protected by the softer layers of glass. Harder and softer glass plates arranged in this manner for bending in the type of molding structure shown in Fig. 1 are advantageous because both top and bottom portions of the assembled unit of superposed plates come in contact with the molding elements under pressure.

In molding or bending glass upon the type of structure shown in the Galey Patent 2,021,180, mentioned above, the outer softer sheets 21 and 23 are not necessary because the glass bends under the influence of gravity and is not subjected to the contact with the curved molding surfaces, except along the marginal portions.

If desired, a mold section 25 having a concave molding surface 26 can be lined along such surface with a layer of glass 27, which softens at lower temperature than the glass plates 15, that is, all of the softer plates 16, 21, 23 and 27 have the same characteristics as to the lower degree of heat required to soften them. The plates 15, 16, and 21 are placed upon the lined mold section 25 in the same manner as that described with reference to the operation of the mold 10 and subjected to heat of sufficient intensity to soften these plates. The heating of the assembled elements is effected in a conventional manner in a furnace such as that shown in the Galey patent referred to above. A plunger or pressure element 29 having a curved molding surface 30 complementary to the surface 26 is applied after the assembly has been heated to the required temperature for bending. The subsequent lamination of the plates 15 with the plastic interlayer 20 to produce an article, such as that shown in Fig. 3, is effected by conventional methods.

In connection with all of the methods described it may be desirable to guard against possible fusion of one plate of glass to another. For such purposes the surfaces of the glass can be dusted with powdered mica, or carbon.

Although only illustrative forms of the invention have been shown and described in detail, it will be apparent to those skilled in the art that the invention is not specifically limited to such forms, but that various changes can be made therein without departing from the spirit of the invention or from the scope of the appended claims.

I claim:

1. A method of preparing glass plates for lamination which comprises assembling two outer plates on opposite sides of a third glass plate having a lower softening point than the first two plates and becoming softer under the influence of a given degree of heat than said outer plates, heating the assembled plates to a softening temperature, bending the assembled plates to predetermined curvature while said third plate remains softer than the other two plates, and removing said third plate.

2. A method of bending glass sheets preparatory to bonding them together with an interposed layer of organic plastic to form a composite safety glass structure; the steps which comprise assembling two first glass sheets on opposite sides of a third glass sheet having a lower softening point than the two first glass sheets, heating the assembled glass sheets until they are sufficiently soft to bend, bending the glass sheets so assembled and heated while the interposed third sheet remains softer than the other two sheets, cooling the assembled sheets, and removing the interposed third sheet.

3. A method of bending glass sheets preparatory to bonding them together with an interposed layer of organic plastic to form a composite safety glass structure; the steps which comprise assembling two first glass sheets upon opposite sides of a third glass sheet having a lower softening point than the first two sheets, further including on the outer sides of said two first sheets outer glass sheets of the same softening point as said third sheet, all of said sheets being superposed with adjacent sheets in face to face contact, heating the assembled glass sheets until they are sufficiently soft to bend as a unit, bending the glass sheets so assembled and heated while the third sheet and other sheets remain softer than said two first sheets, and removing the third sheet and outer sheets.

4. In the manufacture of bent laminated safety glass including superposed glass sheets and a substantially co-extensive interposed layer of organic plastic adherent to the inner surfaces of the glass sheets; the method steps which comprise assembling two first glass sheets on opposite sides of a third glass sheet having a lower softening point than the first two glass sheets, heating the assembled glass sheets until they are sufficiently soft to bend, bending the glass sheets so assembled and heated while the interposed third glass sheet remains softer than said two first sheets, cooling the assembled sheets, and removing the interposed third sheet prior to laminating the remaining two first sheets on opposite sides of a layer of organic plastic.

5. In the manufacture of bent laminated safety glass including superposed glass sheets and a substantially co-extensive interposed layer of organic plastic adherent to the inner surfaces of the glass sheets; the method steps which comprise assembling two first glass sheets on opposite sides of a third glass sheet having a lower softening point than the two first sheets, further including on the outer sides of said two first sheets outer glass sheets of the same softening point as said third glass sheet, all of said sheets being superposed with adjacent sheets in face to face contact, heating the assembly of glass sheets until they are sufficiently soft to bend, bending together all of the glass sheets so assembled and heated while the third sheet and outer sheets remain softer than said two first sheets, removing said third sheet and outer sheets prior to the laminating of the two first sheets with the interposed plastic sheet.

6. In the manufacture of bent laminated safety glass including superposed glass sheets and a substantially co-extensive interposed layer of organic plastic adherent to the inner surfaces of the glass sheets; the method steps which comprise assembling two first glass sheets with slight irregularities and particles thereon on opposite sides of a third glass sheet having a lower softening point than the two first sheets, heating the assembly of glass sheets until they are sufficiently soft to bend, bending together the glass sheets so assembled and heated while the interposed third sheet remains softer than said two first sheets, all irregularities and particles along the inner surfaces of said two first sheets impressing into the softer third glass sheet during the bending thereof with the third glass sheet materially uneffecting the inner surfaces of the two first glass sheets other than maintaining them in spaced relation, and removing said third sheet prior to the laminating of the two first sheets with the interposed plastic sheet.

LLOYD V. BLACK.

REFERENCES CITED

The following references are of record in the file of this patent:

UNITED STATES PATENTS

| Number | Name | Date |
|---|---|---|
| 1,716,350 | Bart | June 4, 1929 |
| 1,992,976 | Watkins | Mar. 5, 1935 |
| 2,021,180 | Galey | Nov. 19, 1935 |
| 2,314,325 | Binkert | Mar. 23, 1943 |
| 2,357,537 | Orser et al. | Sept. 15, 1944 |
| 2,377,849 | Binkert et al. | June 12, 1945 |